United States Patent
Kitamura

(12) 
(10) Patent No.: US 6,741,045 B2
(45) Date of Patent: May 25, 2004

(54) BICYCLE CONTROL APPARATUS THAT COMMUNICATES POWER AND DATA OVER A SINGLE TRANSMISSION PATH

(75) Inventor: Satoshi Kitamura, Kitakatsuragi-gun (JP)

(73) Assignee: Shimano, Inc., Sakai (JP)

( * ) Notice: Subject to any disclaimer, the term of this patent is extended or adjusted under 35 U.S.C. 154(b) by 28 days.

(21) Appl. No.: 10/131,404

(22) Filed: Apr. 23, 2002

(65) Prior Publication Data
US 2003/0197480 A1 Oct. 23, 2003

(51) Int. Cl.[7] ............................................. H02K 7/06
(52) U.S. Cl. .................... 318/14; 318/560; 318/600; 474/69; 474/70; 375/135; 375/136; 375/237
(58) Field of Search ......................... 318/14, 560, 600, 318/16, 34, 17, 520, 1, 2, 139; 474/70, 69; 375/135, 136, 237

(56) References Cited

U.S. PATENT DOCUMENTS

| 4,605,240 A | * | 8/1986 | Clem et al. .................. 280/236 |
| 4,638,496 A | * | 1/1987 | Jensen ......................... 375/351 |
| 5,424,709 A | | 6/1995 | Tal .............................. 340/310 |
| 5,483,137 A | * | 1/1996 | Fey et al. .................... 318/560 |
| 5,551,315 A | * | 9/1996 | Pikoulas ..................... 74/502.2 |
| 5,728,017 A | * | 3/1998 | Bellio et al. .................. 474/70 |
| 5,865,454 A | * | 2/1999 | Campagnolo .............. 280/238 |
| 5,952,914 A | | 9/1999 | Wynn ..................... 340/310.01 |
| 6,047,230 A | * | 4/2000 | Spencer et al. ............... 701/57 |
| 6,057,657 A | * | 5/2000 | Kitamura ..................... 318/16 |
| 6,146,297 A | * | 11/2000 | Kimura ....................... 474/78 |
| 6,352,486 B1 | * | 3/2002 | Wesling ....................... 474/82 |
| 6,418,041 B1 | * | 7/2002 | Kitamura ..................... 363/125 |
| 6,452,644 B1 | * | 9/2002 | Shimakawa et al. ........ 348/730 |
| 2001/0027495 A1 | * | 10/2001 | Campagnolo ............... 709/248 |

FOREIGN PATENT DOCUMENTS

| EP | 887251 A1 | 12/1998 |
| GB | 2348349 A | 9/2000 |
| JP | 10-91243 | 4/1998 |
| WO | WO 95/26900 | 10/1995 |

* cited by examiner

*Primary Examiner*—Rita Leykin
(74) *Attorney, Agent, or Firm*—James A. Deland

(57) ABSTRACT

A bicycle control apparatus includes a bicycle component control unit having one of a control transmitter and a control receiver; a computer control unit having the other one of the control transmitter and the control receiver; and a transmission path coupled to the bicycle component control unit and to the computer control unit. The control transmitter communicates both power and data to the control receiver over the transmission path.

29 Claims, 9 Drawing Sheets

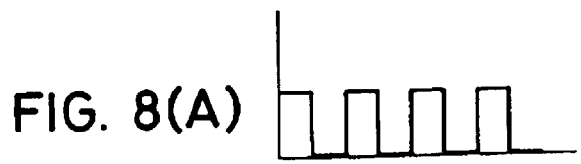
FIG. 8(A)
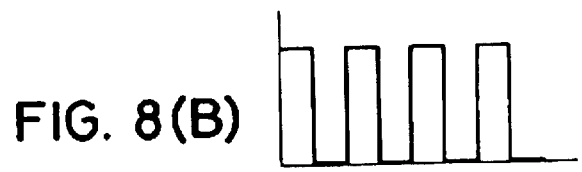
FIG. 8(B)
FIG. 8(C)
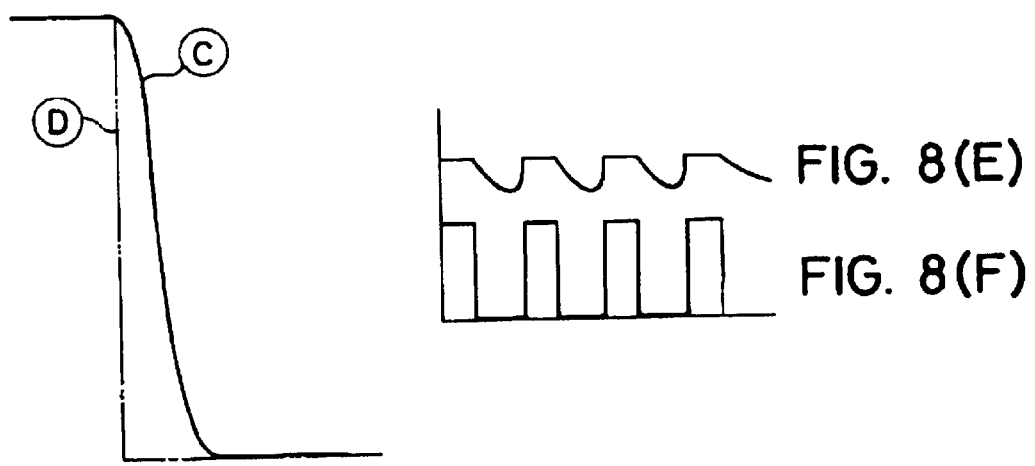
FIG. 8(E)
FIG. 8(F)
FIG. 8(D)

US 6,741,045 B2

BICYCLE CONTROL APPARATUS THAT COMMUNICATES POWER AND DATA OVER A SINGLE TRANSMISSION PATH

BACKGROUND OF THE INVENTION

The present invention is directed to bicycles and, more particularly, to a bicycle signal processing device that operates more reliably in the bicycling environment.

Many bicycle signal processing systems have been developed. A typical system often gathers and displays information related to bicycle speed, cadence, distance traveled and the like. Such systems usually include a magnet mounted to a wheel spoke, a magnet mounted to one of the pedal cranks, and magnet sensors mounted to the bicycle frame for sensing the passage of the magnets as the wheel and crank revolve. An electrical pulse is generated every time a magnet passes its associated sensor (e.g., once per wheel or crank revolution). The speed of the bicycle can be calculated based on the number of pulses received from the wheel sensor per unit of time and the circumference of the wheel. Similarly, the distance traveled can be calculated based on the number of pulses received over a length of time and the circumference of the wheel. The cadence can be calculated based on the number of pulses received from the crank sensor per unit of time. One or more switches ordinarily are provided for entering operating parameters (e.g., the wheel circumference), for selecting what information is displayed to the rider, and for starting and stopping various timers used for calculating the desired information.

More sophisticated systems have the ability to display information related to the state of the bicycle transmission. For example, some bicycles have a plurality of front sprockets that rotate with the pedal cranks, a plurality of rear sprockets that rotate with the rear wheel, and a chain that engages one of the front sprockets and one of the rear sprockets. A front derailleur is mounted to the bicycle frame for shifting the chain among the plurality of front sprockets, and a rear derailleur is mounted to the bicycle frame for shifting the chain among the plurality of rear sprockets. Manually operated switches or levers may control the front and rear derailleurs. Position sensors (e.g., potentiometers or contact sensors) are mounted to the switches or levers so that the front and rear sprockets currently engaged by the chain may be determined by the positions of the corresponding switches or levers. Such information may be displayed to the rider so that the rider may operate the transmission accordingly. Even more sophisticated systems use small electric motors to control the bicycle transmission. The motors may be controlled manually by the foregoing switches or levers, or automatically based on bicycle speed and/or cadence.

The switches, sensors and other electrical components of the signal processing system are often spaced apart from each other and are connected by wires. Not surprisingly, it is desirable to construct the system such that the components are easily installed and removed and to ensure that the electrical signals are reliably communicated from one component to another. To facilitate assembly and removal of the components, it is common to construct the signal processing system as a modular unit, wherein the individual components are connected to each other using detachable electrical connectors. However, when a bicycle is ridden in a wet environment, moisture may enter the connector and form a conductive path to other electrical components or to the frame, thus causing a short circuit or otherwise altering the signals communicated along the wires. The effect is particularly severe when the signals communicated along the wires are high impedance signals. Because of the small amount of current associated with such high impedance signals, a very small amount of current flowing away from a signal wire can result in a large effect on the signal traveling through that wire, usually in the form of an unacceptably large change in signal voltage. As a result, waterproof connectors must be used to connect the components together, thus increasing the cost of the device.

Finally, because the number of components may be large, it is usually desirable to minimize the number of wires running along the bicycle. Such minimization of wiring not only decreases the cost of the device but also minimizes the number of connectors needed to connect the device together.

SUMMARY OF THE INVENTION

The present invention is directed to a bicycle signal processing device which communicates information from one signal processing element to another signal processing element more reliably than known systems. In one embodiment of the present invention, a bicycle control apparatus includes a bicycle component control unit having one of a control transmitter and a control receiver; a computer control unit having the other one of the control transmitter and the control receiver; and a transmission path coupled to the bicycle component control unit and to the computer control unit. The control transmitter communicates both power and data to the control receiver over the transmission path.

In a more specific embodiment of the present invention, the computer control unit is disposed in a bicycle computer adapted to be mounted to the bicycle, wherein the bicycle computer includes a power circuit coupled to the transmission path. The bicycle component control unit may have the control transmitter, and the computer control unit may have the control receiver. A first motor driver may be coupled to the processor, a first motor may be coupled to the first motor driver, and a derailleur or suspension element may be coupled to the first motor. The information communicated between the bicycle component control unit and the computer control unit may be used to control the operation of the motor driver and the associated derailleur and/or suspension element.

BRIEF DESCRIPTION OF THE DRAWINGS

FIGS. 8(A)–8(F) are diagrams showing the waveforms of signals at various points in the circuit shown in FIGS. 7(A) and 7(B)

DETAILED DESCRIPTION OF THE EMBODIMENTS

Figure 1:
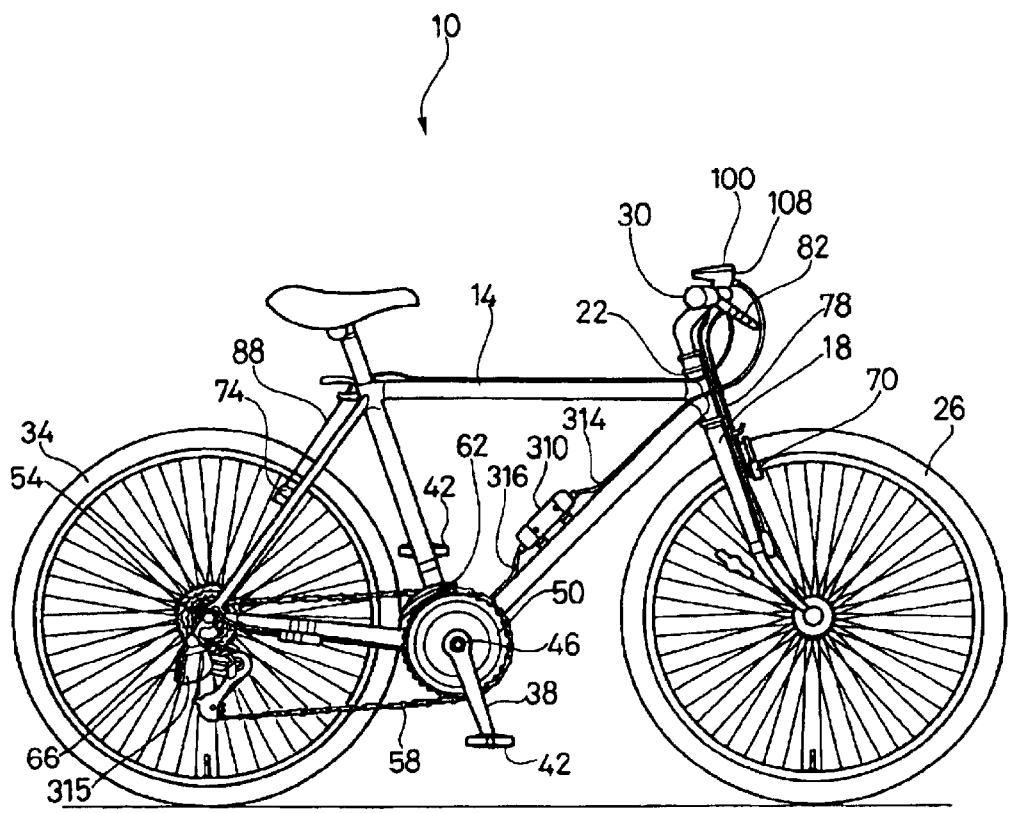
FIG. 1 is a side view of a bicycle that includes a particular embodiment of a signal processing device according to the present invention.
Figure 2:
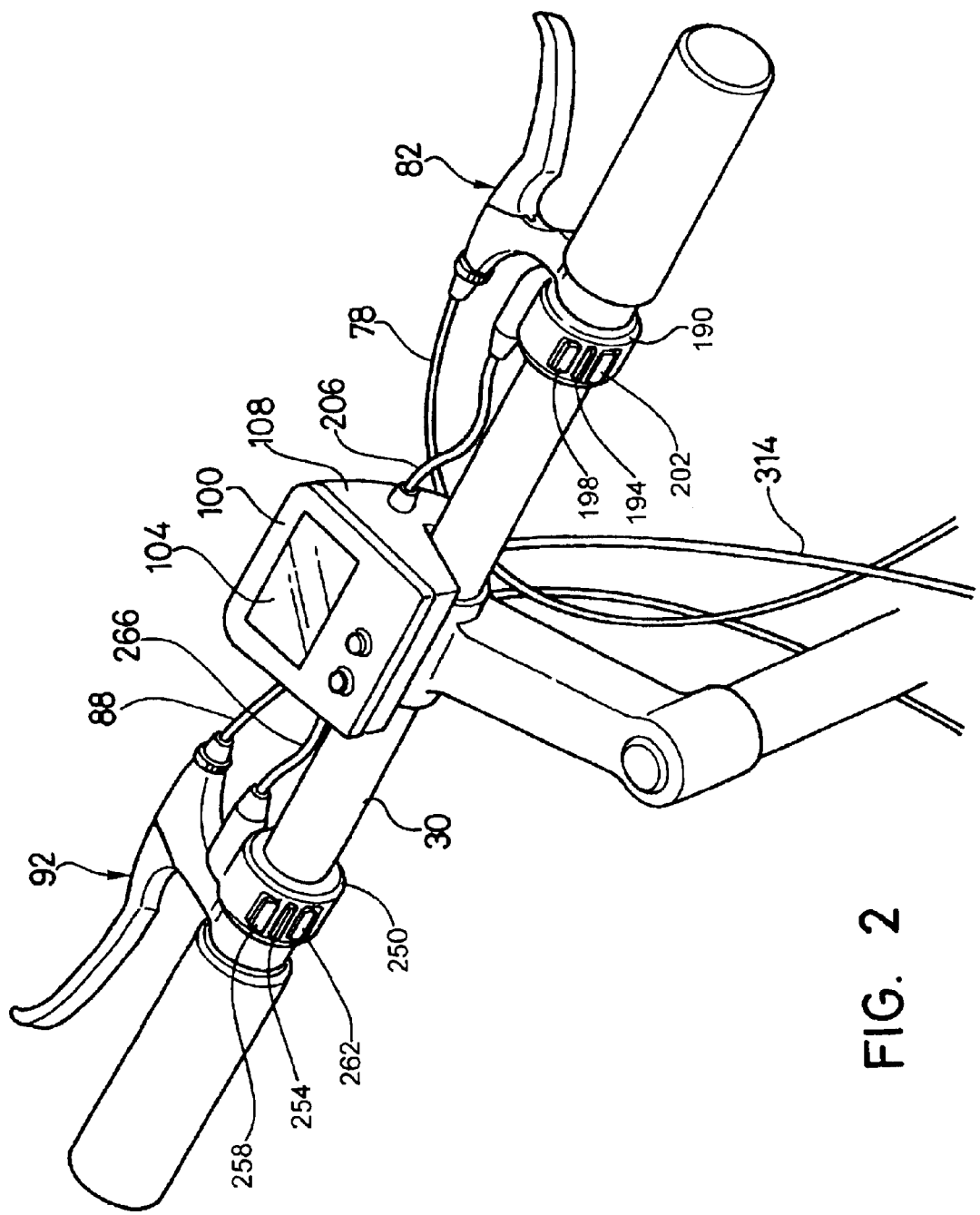
FIG. 2 is an oblique view of the handlebar mounted components of the signal processing device.

FIG. 1 is a side view of a bicycle 10 that includes a particular embodiment of a signal processing device 12 (FIG. 3) according to the present invention. Bicycle 10 has a frame 14, a front fork 18 rotatably supported in a head tube 22 of frame 14, a front wheel 26 rotatably supported by fork 18, a handlebar 30 for rotating fork 18 (and hence front wheel 26) in the desired direction, and a rear wheel 34 rotatably supported at the rear of frame 14. A pair of crank arms 38, each supporting a pedal 42, are mounted to an axle 46 that is rotatably supported in a lower portion of frame 14. A plurality of front sprockets 50 are mounted to the right side crank arm 38 for rotating with the right side crank arm 38, and a plurality of rear sprockets 54 are mounted to the rear wheel 34 for rotating with rear wheel 34. A chain 58 engages one of the front sprockets 50 and one of the rear sprockets 54. A front derailleur 62 is mounted to frame 14 in close proximity to the plurality of front sprockets 50 for moving chain 58 among the plurality of front sprockets 50, and a rear derailleur 66 is mounted to frame 14 in close proximity to the plurality of rear sprockets 54 for moving chain 58 among the plurality of rear sprockets 54. A front braking unit 70 is mounted to fork 18 for braking front wheel 26, and a rear braking unit 74 is mounted to the rear of frame 14 for braking rear wheel 34. Front braking unit 70 is connected to a Bowden-type control cable 78 that is connected to a brake lever assembly 82 mounted on the right side of handlebar 30 as shown in FIG. 2. Similarly, rear braking unit 74 is connected to a Bowden-type control cable 88 that is connected to a brake lever assembly 92 mounted on the left side of handlebar 30.

Figure 3:
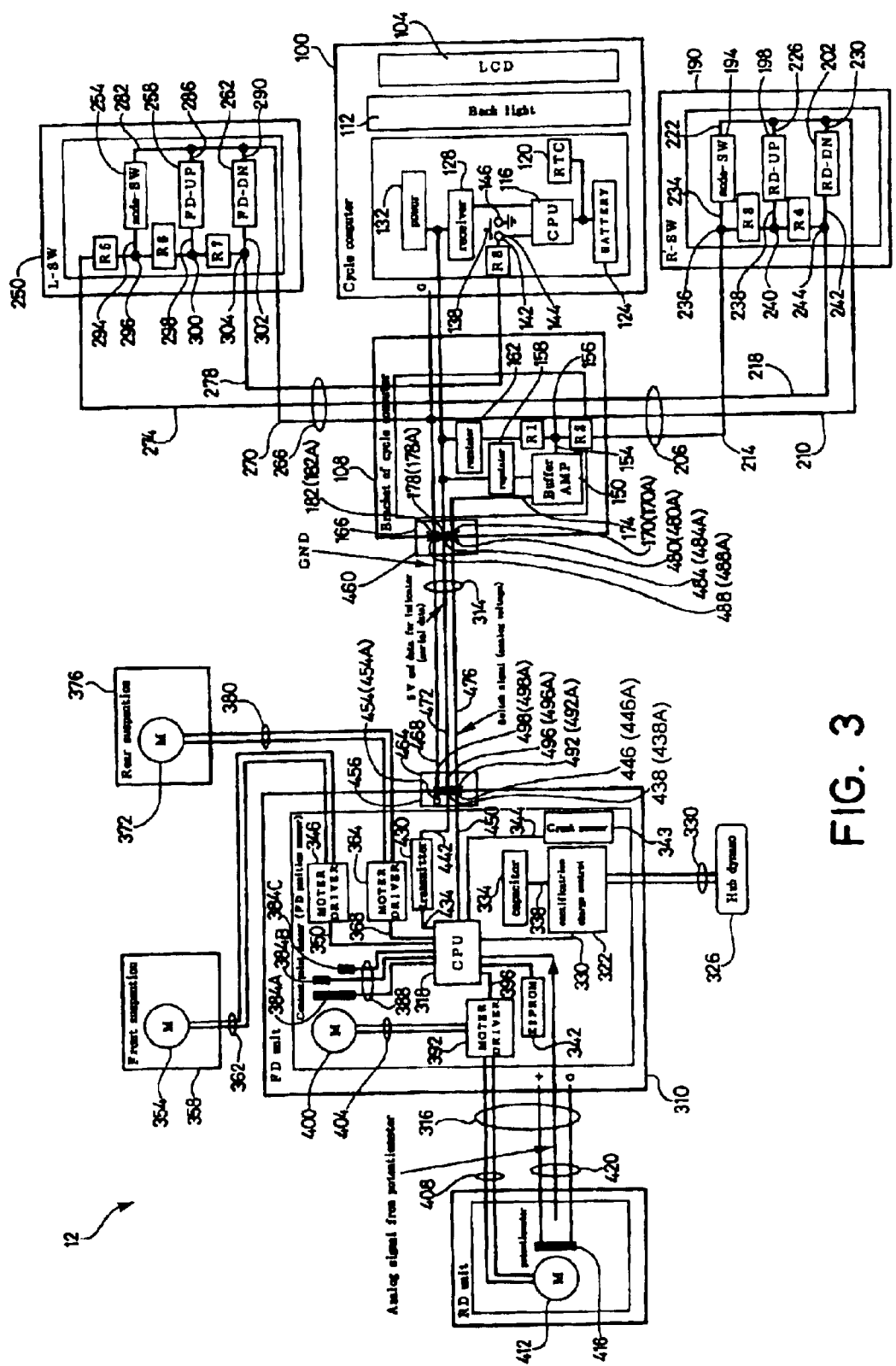
FIG. 3 is a detailed block diagram of a particular embodiment of a signal processing device according to the present invention.

As shown in FIGS. 1–3, a display housing 100 that is part of a computer control unit having an LCD display 104 is coupled to a mounting bracket 108 attached to handlebar 30. As shown in FIG. 3, display housing 100 houses a backlight 112 for display 104, a processor 116 for controlling the operation of display 104, a real time clock (RTC) circuit 120 for providing timing information, a battery 124 for providing backup power for the data stored in processor 116, a receiver circuit 128 for receiving data in a manner described below, a power circuit 132 for receiving power in a manner described below, a resistance (e.g., resistor) R8 coupled to processor 116, and a switch 138 having a terminal 142 coupled to a node 144 between resistance R8 and processor 116 for selecting the information displayed on display 104. The other terminal 146 of switch 138 is connected to a ground potential.

Mounting bracket 108 houses serially connected resistances (e.g., resistors) R1 and R2, a buffer amplifier 150 having an input terminal 154 connected to a node 156 between resistances R1 and R2, a voltage regulator 158 for supplying a regulated voltage to buffer amplifier 150, a voltage regulator 162 for supplying a regulated voltage to resistance R1, and a connector 166. Connector 166 includes an external output terminal 170 connected to an output terminal 174 of buffer amplifier 150, a power/data input terminal 178 for communicating power to voltage regulators 158 and 162 in mounting bracket 108 and to power circuit 132 in display housing 100 and for communicating data to receiver circuit 128 in display housing 100, and a ground terminal 182 for providing a ground potential to the components in mounting bracket 108 and display housing 100. External output terminal 170, power/data input terminal 178 and ground terminal 182 have exposed contact surfaces 170a, 178a and 182a, respectively.

In this embodiment, the relevant signal processing elements within display housing 100 are directly connected to the relevant signal processing elements within mounting bracket 108. In other embodiments, display housing 100 may be detachably mounted to mounting bracket 108 in a known manner, wherein exposed electrical contacts (in electrical communication with the relevant components in display housing 100) on display housing 100 contact exposed electrical contacts (in electrical communication with the relevant components in mounting bracket 108) on mounting bracket 108.

A right switch housing 190 containing a mode switch 194, a rear derailleur upshift switch 198, a rear derailleur downshift switch 202 and serially connected resistances (e.g., resistors) R3 and R4 is mounted to the right side of handlebar 30. The relevant signal processing elements within right switch housing 190 are coupled to an intermediate communication path 206 which, in this embodiment, comprises a ground potential communication path 210, a resistance communication path 214 and a resistance communication path 218. More specifically, ground potential communication path 210 is connected to a terminal 222 of mode switch 194, to a terminal 226 of rear derailleur upshift switch 198 and to a terminal 230 of rear derailleur downshift switch 202. Another terminal 234 of mode switch 194 is connected to a node 236 on resistance communication path 214 near resistance R3, another terminal 238 of rear derailleur upshift switch 198 is connected to a node 240 between resistances R3 and R4, and another terminal 242 of rear derailleur downshift switch 202 is connected to a node 244 on resistance communication path 218 near resistance R4.

A left switch housing 250 containing a mode switch 254, a front derailleur upshift switch 258, a front derailleur downshift switch 262 and serially connected resistances (e.g., resistors) R5, R6 and R7 is mounted to the left side of handlebar 30. The relevant signal processing elements within left switch housing 250 are coupled to an intermediate communication path 266 which, in this embodiment, comprises a ground potential communication path 270, a resistance communication path 274 and a resistance communication path 278. More specifically, ground potential communication path 270 is connected to a terminal 282 of mode switch 254, to a terminal 286 of front derailleur upshift switch 258 and to a terminal 290 of front derailleur downshift switch 262. Another terminal 294 of mode switch 254 is connected to a node 296 between resistances R5 and R6, another terminal 298 of front derailleur upshift switch 258 is connected to a node 300 between resistances R6 and R7, and another terminal 302 of front derailleur downshift switch 262 is connected to a node 304 on resistance communication path 278 near resistance R7. Resistance communication path 274 is connected to resistance R5.

As shown in FIG. 1, a front derailleur control housing 310 is mounted to frame 14, and it is coupled to mounting bracket 108 through an intermediate communication path 314. A rear derailleur control housing 315 is mounted to rear derailleur 66, and it is electrically coupled to front derailleur control housing 310 through an intermediate communication path 316. As shown in FIG. 3, front derailleur control housing 310 is part of a bicycle component control unit that contains a processor 318, a rectifier and charge control circuit 322 for receiving current from a hub dynamo 326 mounted to rear wheel 34 (not shown) through a communication path 330 and for supplying power to processor 318 through a communication path 330, a capacitance (e.g., capacitor) 334 coupled to rectifier and charge control circuit 322 through a communication path 338 for providing power to other circuit elements as described below, and a programmable memory 342 for storing the programming for processor 318. A crank sensor 343 coupled to processor 318 through a communication path 344 is provided for sensing signals from a magnet (not shown) coupled to the left side crank arm 38. An optional motor driver 346 is coupled to processor 318 through a communication path 350 for controlling the operation of a motor 354 through a communication path 362 for adjusting an optional front suspension 358, and an optional motor driver 364 is coupled to processor 318 through a communication path 368 for controlling the operation of a motor 372 through a communication path 380 for adjusting an optional rear suspension 376. A contact sensor shown as contacts 384a, 384b and 384c is coupled to processor 318 through a communication path 388 for providing signals indicating the position of a front derailleur motor 400 used to position front derailleur 62. A motor driver 392 is coupled to processor 318 through a communication path 396 for controlling the operation of front derailleur motor 400 through a communication path 404. Motor driver 392 also provides signals over a communication path 408, which is part of intermediate communication path 316, for controlling the operation of a rear derailleur motor 412 contained in rear derailleur control housing 315. A potentiometer 416 contained in rear derailleur control housing 315 is coupled to processor 318 through a communication path 420, which is part of intermediate communication path 316, for providing signals indicating the position of motor 412, and hence rear derailleur 66.

A power/data transmitter 430 is coupled to processor 318 through a communication path 434 for providing power and data signals through a communication path 442 to an external power/data output terminal 438 having a contact surface 438a. An external switch signal input terminal 446 having a contact surface 446a is coupled to processor 318 through a communication path 450, and a ground terminal 454 having a contact surface 454a is used to communicate a ground potential among the components in front derailleur control housing 310. Terminals 438, 446 and 454 form part of a connector 456.

As noted above, front derailleur control housing 310 is electrically connected to mounting bracket 108 through an intermediate communication path 314. Intermediate communication path 314 includes a connector 460 that couples to connector 166 on mounting bracket 108, a connector 464 that couples to connector 456 on front derailleur control housing 310, an intermediate ground potential communication path 468, an intermediate power/data communication path 472, and an intermediate switch signal communication path 476. In this embodiment, each communication path 468, 472 and 476 comprises a wire, but of course one or more of these communication paths may be an optical communication element or be replaced by a wireless communication method. In this embodiment, connector 460 includes connector terminals 480, 484 and 488 with contact surfaces 480a, 484a and 488a for contacting the respective contact surfaces 170a, 178a and 182a of external output terminal 170, power/data input terminal 178 and ground terminal 182. Similarly, connector 464 includes terminals 492, 496 and 498 with contact surfaces 492a, 496a and 498a for contacting the respective contact surfaces 446a, 438a and 454a of switch signal input terminal 446, power/data output terminal 438 and ground terminal 454.

Figure 4:
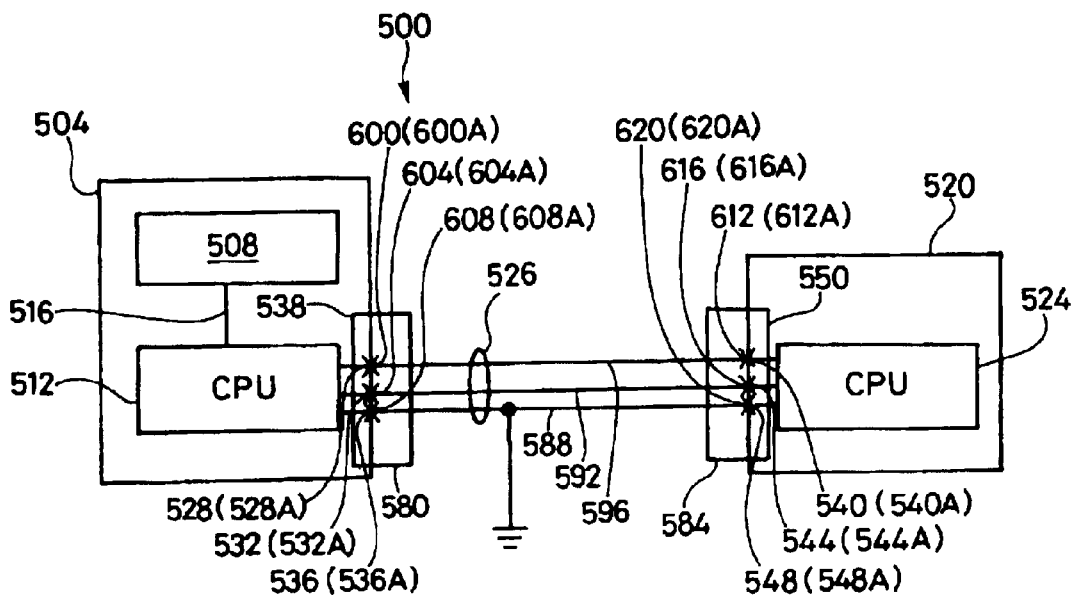
FIG. 4 is conceptual schematic diagram of a prior art signal processing device.

Before continuing with the description of signal processing device 12, it maybe helpful to consider a prior art signal processing device 500 shown conceptually in FIG. 4. As shown in FIG. 4, signal processing device 500 includes a housing 504 containing a signal processing element 508 (a switch, sensor, etc.) connected to a processor 512 through a communication path 516, a housing 520 containing a processor 524, and an intermediate communication path 526. Processor 512 is connected to external terminals 528, 532 and 536 having respective contact surfaces 528a, 532a and 536a. Similarly, processor 524 is connected to external terminals 540, 544 and 548 having respective contact surfaces 540a, 544a and 548a. Terminals 528, 532 and 536 form part of a connector 538, and terminals 540, 544 and 548 form part of a connector 550. Intermediate communication path 526 includes a connector 580 for coupling to connector 538 on housing 504, a connector 584 for coupling to connector 550 on housing 520, an intermediate ground potential communication path 588, an intermediate power communication path 592, and an intermediate data signal communication path 596. Intermediate ground potential communication path 588 is shown coupled to a ground potential because the ground potential need not originate in processor 512 or processor 524. Such a ground potential may exist at the terminal of a power supply, at the metallic or other conductive elements forming housings 504 and/or 520, or even the bicycle frame or other conductive components attached to the bicycle. Each communication path 588, 592 and 596 typically comprises a wire. The signals on communication paths 592 and 596 typically are high impedance signals, and very little current flows through them. Connector 580 includes connector terminals 600, 604 and 608 with contact surfaces 600a, 604a and 608a for contacting the respective contact surfaces 528a, 532a and 536a of terminals 528, 532 and 536. Similarly, connector 584 includes terminals 612, 616 and 620 with contact surfaces 612a, 616a and 620a for contacting the respective contact surfaces 540a, 544a and 548a of external terminals 540, 544 and 548.

If water were to enter between connector 580 and connector 538, for example, there is a possibility that the water, being somewhat conductive, will form a conductive path between communication paths 592 and/or 596 and the ground potential. The effect may be similar to current siphoned off through a resistance of, for example, 1K ohms to a ground potential. Since the signals on intermediate communication paths 592 and 596 are high impedance signals, and since the current flowing through the intermediate communication paths 592 and 596 is very small, the voltage appearing at processor 524 will vary greatly even if the current lost through the conductive path is small. Indeed, it is possible that a complete short circuit may result. In any event, such a voltage variation may cause processor 524 to malfunction. To prevent such malfunctioning, it is necessary that connectors 580 and 584 be constructed to provide a waterproof seal. This not only increases the initial cost of the device, but over time the connectors may lose their waterproof quality, thus requiring replacement of the connectors, if not the entire device.

Figure 5:
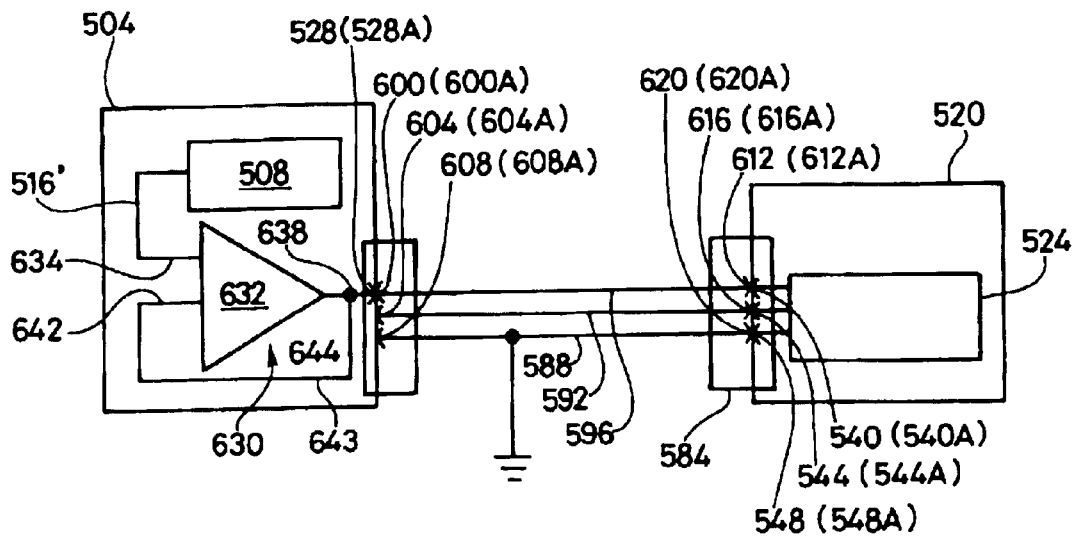
FIG. 5 is a conceptual schematic diagram showing a particular embodiment of an impedance converting circuit according to the present invention.

FIG. 5 is a conceptual schematic diagram showing how the circuit of FIG. 4 is modified in accordance with the principles of the present invention. In this case, signal processing element 508 is not connected through processor 512 (processor 512 has been omitted from the diagram, but processor 512 still may be connected for communicating with intermediate communication paths 588 and 592 as shown in FIG. 4). Instead, signal processing element 508 is connected to intermediate data signal communication path 596 through an impedance converting circuit 630 that converts the high impedance switch signal appearing on communication path 516' into a low impedance switch signal that is communicated on intermediate data signal communication path 596. In this example, impedance converting circuit 630 may be an operational amplifier 632 having an input terminal 634 connected to communication path 516', an output terminal 638 connected to external terminal 528, and an input terminal 642 connected to a feedback path 643 that is connected to a node 644 between output terminal 638 and external output terminal 528.

Figure 6:
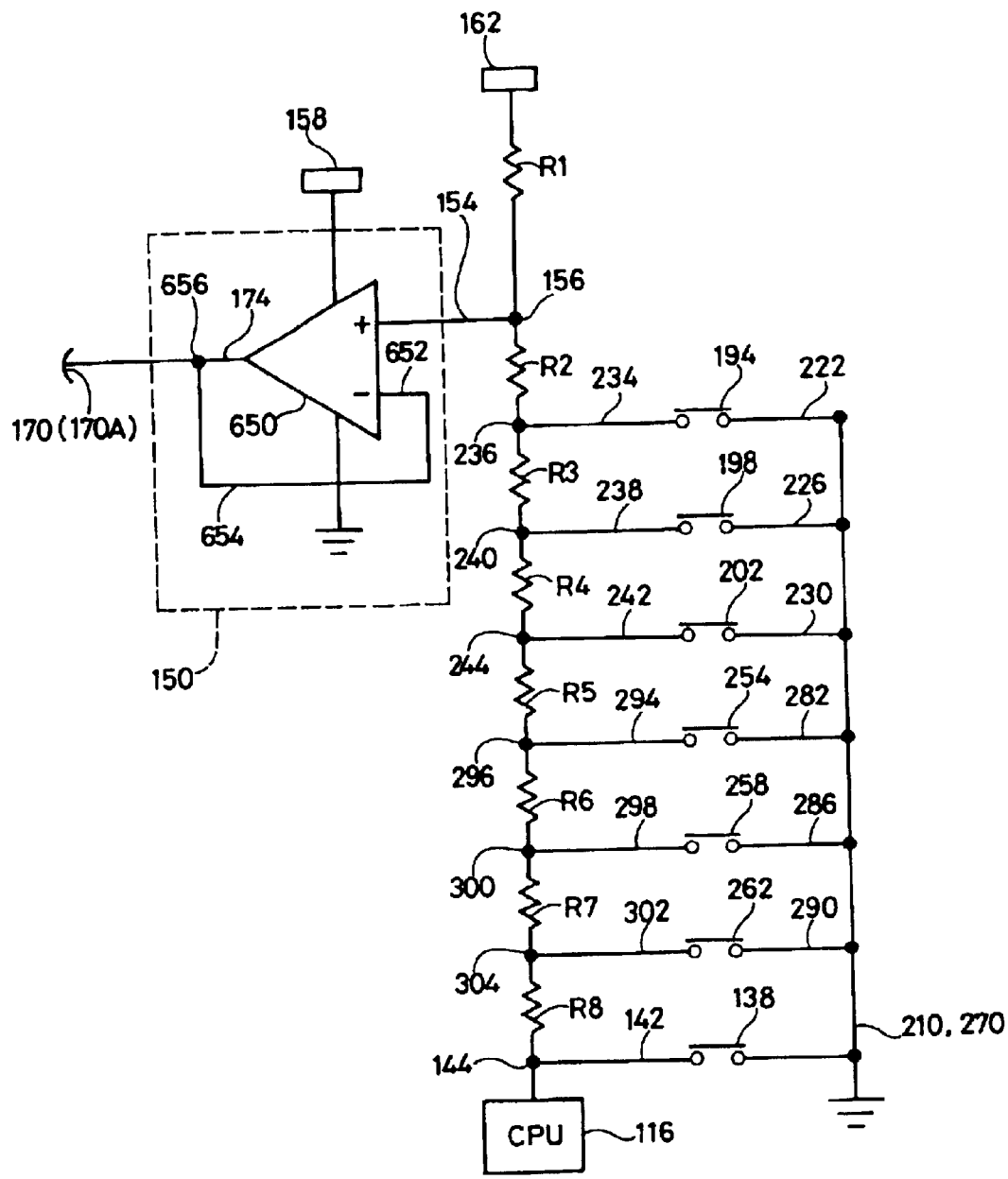
FIG. 6 is a schematic diagram of a particular embodiment of a signal processing element and impedance converting circuit according to the present invention.

FIG. 6 is a detailed schematic diagram showing how the principles of the present invention are applied to the device shown in FIG. 3. Buffer 150 functions as an impedance converting circuit, and in this embodiment it comprises an operational amplifier 650 having the input terminal 154 connected to the node 156 between resistances R1 and R2, the output terminal 174 connected to external output terminal 170, and an input terminal 652 connected to a feedback path 654 that is connected to a node 656 between output terminal 174 and external output terminal 170. One of ordinary skill in the art will readily recognize that, in this embodiment, operational amplifier 650 is configured as a noninverting, unity gain amplifier. Buffer 150 converts the high impedance signal at input terminal 154 into a low impedance signal at output terminal 174. The signal at output terminal 174 has an impedance of substantially zero.

Resistances R1–R8 are connected together in series, with switches 194, 198, 202, 254, 258 and 262 each having one terminal connected to a node 236, 240, 244, 296, 300 and 304, respectively, between adjacent pairs of the resistances. The other terminals of switches 194, 198, 202, 254, 258 and 262 are connected to the ground potential appearing on ground potential communication paths 210 and 270. Resistances R1–R8 thus function as a voltage divider such that the analog voltage appearing at input terminal 154 of operational amplifier 650 (and hence output terminal 174 of operational amplifier) will vary depending upon which switch 194, 198, 202, 254, 258 and 262 is closed. In this embodiment, resistances R1–R8 have values of 10 k, 2.2 k, 2.2 k, 2.2 k, 3.3 k, 5.6 k, 8.2 k and 18 k ohms, respectively.

Because the varying voltage signal set by the switches 194, 198, 202, 254, 258 and 262 and appearing at output terminal 174 of operational amplifier 650 is a low impedance signal, it will be substantially unaffected by any water that enters between connectors 166 and 460 and/or connectors 456 and 464. Also, the switch signals may be communicated directly to the processor 318 in front derailleur control housing 310. Thus, it is not necessary to incur the expense of using a separate processor to process the switch signals as in the prior art. Operational amplifier 650 also stabilizes the voltages for use by processor 318 (e.g., 10 millivolts either way).

As noted above when discussing the prior art device shown in FIG. 4, conventional devices have separate power and data communication paths for communicating power and data from one signal processing element to another. The present device shown in FIG. 3 is constructed to eliminate such separate communication paths and to communicate power and data over a single communication path. More specifically, the device shown in FIG. 3 includes power/data transmitter 430 in front derailleur control housing 310 for communicating power and data over communication path 442, then to intermediate power/data communication path 472, and ultimately to receiver circuit 128 and power circuit 132 in display housing 100.

Figure 7A:
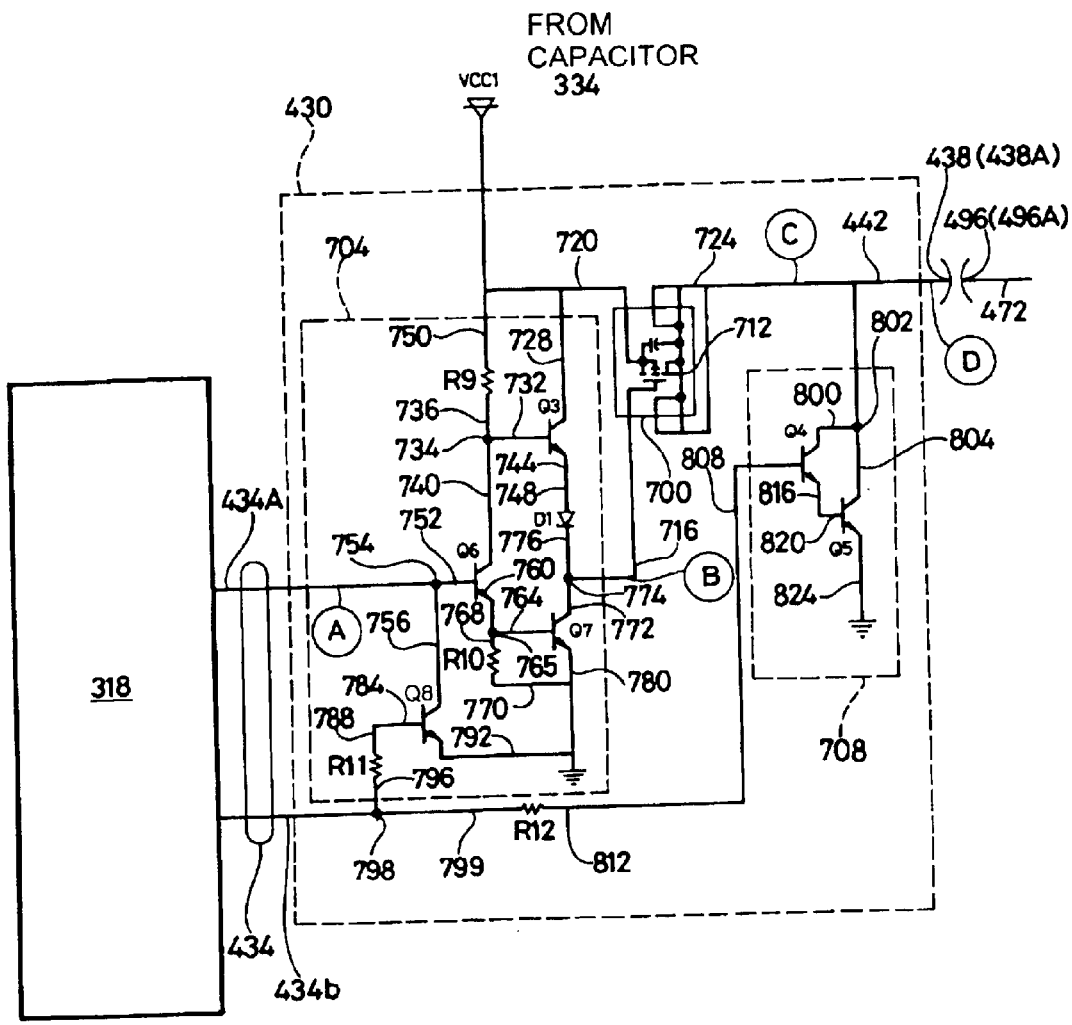
FIGS. 7(A) and 7(B) together comprise a schematic diagram of a circuit for communicating power and data from a first signal processing element to a second signal processing element.
Figure 7B:
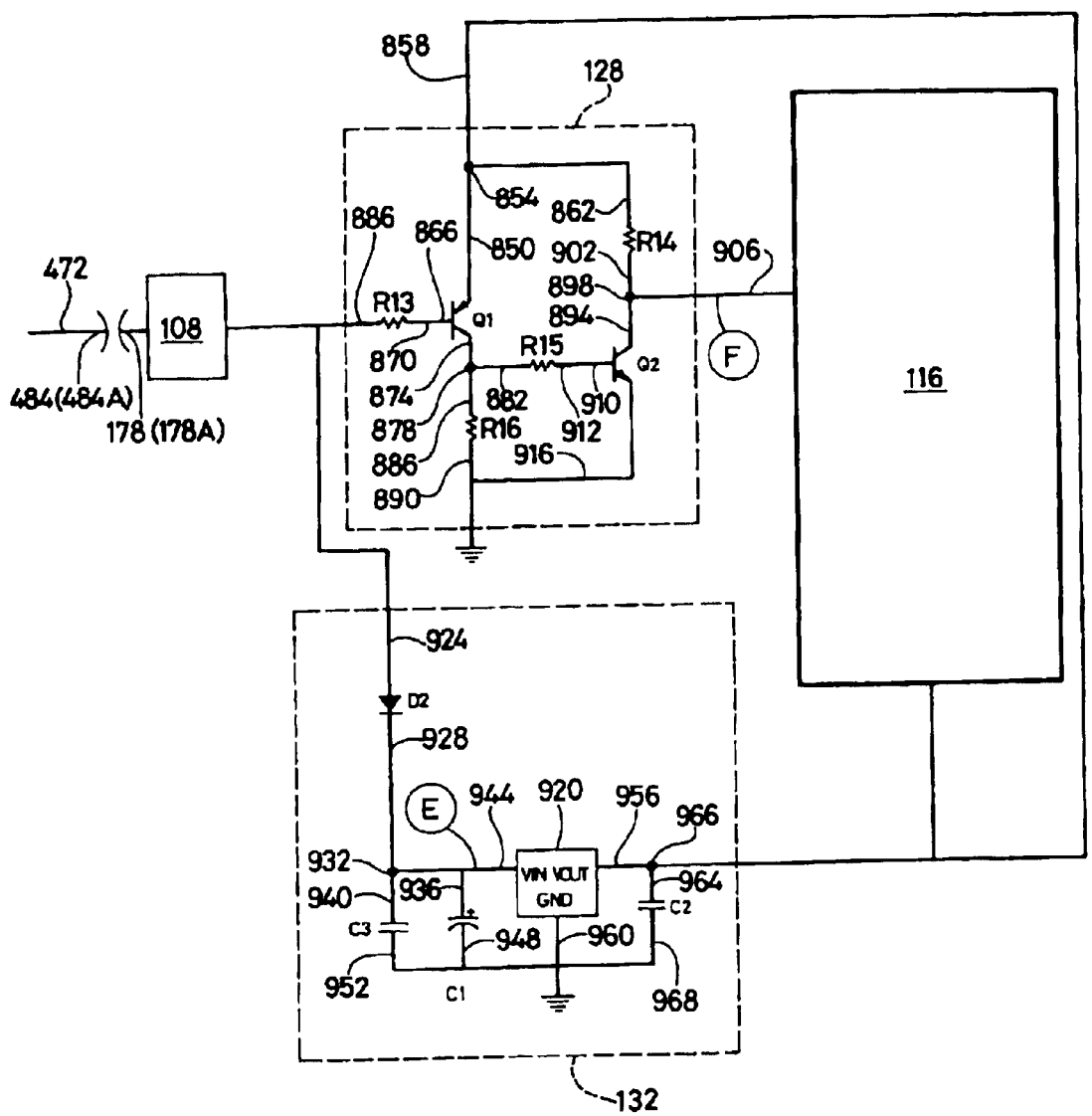

FIGS. 7(A) and 7(B) together comprise a detailed schematic diagram of the relevant components of transmitter 430, receiver circuit 128 and power circuit 132. Transmitter 430 comprises a switching circuit 700, a gate drive circuit 704, and a signal shaping circuit 708. Switching circuit 700 comprises a field-effect transistor 712 having a gate terminal 716, a source terminal 720 coupled for receiving a voltage Vcc from capacitance 334 (FIG. 4), and a drain terminal 724 coupled to communication path 442.

Gate drive circuit 704 controls the operation of switching circuit 700, and it includes NPN bipolar transistors Q3, Q6, Q7 and Q8, resistances (e.g., resistors) R9, R10 and R11, and diode D1. Transistor Q3 has a collector terminal 728 coupled for receiving voltage Vcc, a base terminal 732 connected to a node 734 between a terminal 736 of resistance R9 and a collector terminal 740 of transistor Q6, and an emitter terminal 744 connected to an anode terminal 748 of diode D1. The other terminal 750 of resistance R9 is coupled for receiving voltage Vcc. Transistor Q6 further has a base terminal 752 connected to a node 754 on communication path 434a from processor 318, and an emitter terminal 760 connected to a node 765 between a base terminal 764 of transistor Q7 and a terminal 768 of resistance R10. The other terminal 770 of resistance R10 is coupled to a ground potential. Transistor Q7 further has a collector terminal 772 connected to a node 774 between gate terminal 716 and a cathode terminal 776 of diode D1, and an emitter terminal 780 coupled to a ground potential. Transistor Q8 further has a base terminal 784 connected to a terminal 788 of resistance R11, and an emitter terminal 792 coupled to a ground potential. The other terminal 796 of resistance R11 is connected to a node 798 between communication path 434b from processor 318 and a terminal 799 of resistance R12.

Signal shaping circuit 708 shapes the signal appearing at drain terminal 724 of transistor 712 of switching circuit 700, and it includes NPN bipolar transistors Q4 and Q5. Transistor Q4 includes a collector terminal 800 connected to a node 802 between drain terminal 724 of transistor 712 and a collector terminal 804 of transistor Q5, a base terminal 808 connected to the other terminal 812 of resistance R12, and an emitter terminal 816 connected to a base terminal 820 of transistor Q5. The emitter terminal 824 of transistor Q5 is coupled to a ground potential.

The operation of transmitter 430 may be understood by the signals shown in FIGS. 8(A)–8(D). Lower voltage switching signals shown in FIG. 8(A) (approximately 3.0 volts) are produced by processor 318 on communication path 434(A) (point (A) in FIG. 7(A)), and such signals cause gate drive circuit 704 to produce the higher voltage gate drive signals shown in FIG. 8(B) (approximately 4.5 volts) at gate terminal 716 of transistor 712 (point (B)) to operate switching circuit 700. In response, switching circuit 700 produces the signals shown in FIGS. 8(C) and 8(D) at drain terminal 724 (point (C)). Processor 318 produces the signals on communication path 434b to operate signal shaping circuit 708. The signals on communication path 434b are similar to the signals produced on communication path 434a (FIG. 8(A)) and are substantially the complements (opposites) of the signals produced on communication path 434a (taking into account propagation delay and necessary timing). These signals, through the operation of transistor Q8, ensure that gate drive circuit 704 rapidly shuts off transistor 712. The signals on communication path 434b also cause signal shaping circuit 708 to rapidly sink current from drain terminal 724 of transistor 712 to produce a signal on communication path 442 (point (D)) that more nearly resembles a square wave as shown in FIG. 8(E). The signals shown are for example only. In reality, the signals will have varying pulse widths. Also, in this embodiment the pulses should have a frequency greater than 20 Hz to avoid flicker in the display and other artifacts, but in other embodiments that may not be necessary.

As shown in FIG. 7(B), receiver circuit 128 comprises transistors Q1 and Q2 and resistances (e.g., resistors) R13, R14, R15 and R16. Transistor Q1 has a collector terminal 850 connected to a node 854 between a power line 858 and a terminal 862 of resistance R14, a base terminal 866 connected to a terminal 870 of resistance R13, and an emitter terminal 874 connected to a node 878 between a terminal 882 of resistance R15 and a terminal 886 of resistance R16. The other terminal 886 of resistance R13 is coupled through mounting bracket 108 to power/data input terminal 178, and the other terminal 890 of resistance R16 is coupled to a ground potential. Transistor Q2 has a collector terminal 894 connected to a node 898 between the other terminal 902 of resistance R14 and a communication path 906 to processor 116, a base terminal 910 coupled to the other terminal 912 of resistance R15, and an emitter terminal 916 coupled to a ground potential.

Power circuit 132 comprises a commercially available voltage regulator 920, capacitances (e.g., capacitors) C1–C3, and a diode D2. Diode D2 has an anode terminal 924 coupled through mounting bracket 108 to power/data input terminal 178 and a cathode terminal 928 connected to a node 932 between terminals 936 and 940 of capacitances C1 and C3 and an input terminal 944 of voltage regulator 920. The other terminals 948 and 952 of capacitances C1 and C3 are coupled to a ground potential. Voltage regulator 920 has an output terminal 956 coupled to power line 858 for supplying operating voltage to processor 116 and receiver circuit 128, and a ground terminal 960 coupled to a ground potential. Capacitance C2 has a terminal 964 connected to a node 966 between output terminal 956 and power line 858, and a terminal 968 coupled to a ground potential.

The operation of receiver circuit 128 and power circuit 132 may be understood by the signals shown in FIGS. 8(C)–8(F). The pulse signals output from switching circuit 700 (FIG. 8(C)) and shaped by signal shaping circuit 708 (FIG. 8(D)) are communicated over the single intermediate power/data communication path 472 and through mounting bracket 108 to receiver circuit 128 and power circuit 132. Diode D2 rectifies the incoming signal and charges capacitances C1 and C3 to produce the input signal shown in FIG. 8(E) on input terminal 944 (point (E)). Voltage regulator 920 and capacitance C2 thereafter produce a stable signal (approximately 3 volts) on output terminal 956. The power signal is communicated to processor 116 and receiver circuit 128 through power line 858. Receiver circuit 128 demodulates the incoming signal and produces the data signal shown in FIG. 8(F) (approximately 3 volts) on communication path 906 (point (F)).

Figure 9:
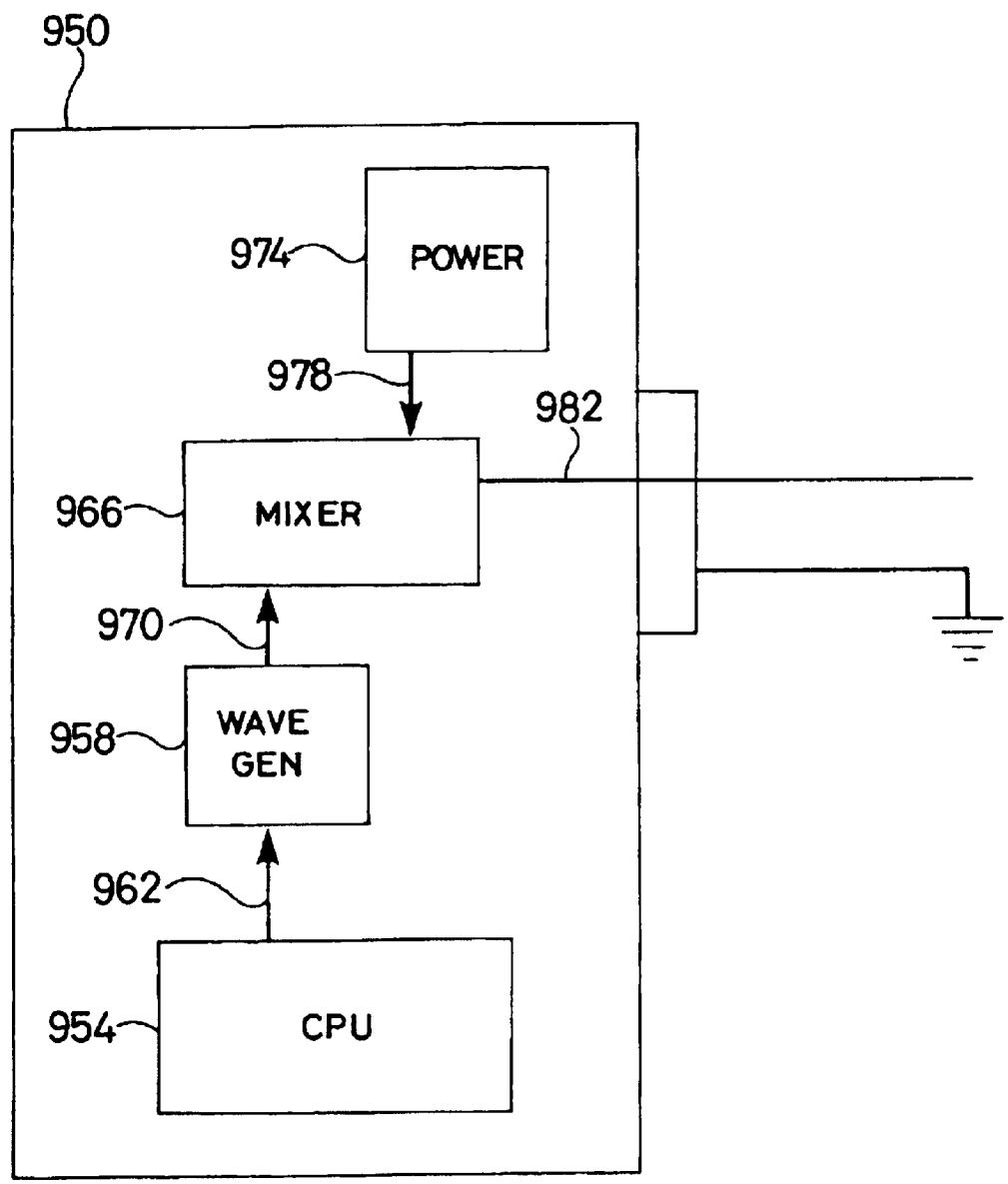
FIG. 9 is a block diagram of an alternative embodiment of a device for communicating power and data from a first signal processing element to a second signal processing element.

While the above is a description of various embodiments of the present invention, further modifications may be employed without departing from the spirit and scope of the present invention. For example, while pulses were used to communicate data in the preferred embodiment, frequency modulation also could be employed. FIG. 9 is a block diagram of such an alternative embodiment of a transmitter 950 for communicating power and data from a first signal processing element to a second signal processing element. In this embodiment, a processor 954 controls a sine wave (or other waveform) generator 958 through a communication path 962. The generated waveform is communicated to a mixing circuit 966 through a communication path 970. Mixer 966 receives power from a power source 974 through a communication path 978, combines the power and waveform signals, and communicates the combined signals on a communication path 982. In such an embodiment the frequency of the waveform should be less than 500 KHz to avoid radio interference or other artifacts, but that may not be necessary in other embodiments.

The size, shape, location or orientation of the various components may be changed as desired. Components that are shown directly connected or contacting each other may have intermediate structures disposed between them. The functions of one element may be performed by two, and vice versa. While an operational amplifier was used as an impedance converting circuit in the preferred embodiment, many other circuit elements could be used. For example, bipolar transistors having an emitter-follower configuration could replace operational amplifier 650. The number of switches and resistances will depend upon the application and their assigned function. Power and data communication could occur bidirectionally. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle control apparatus comprising:
   a bicycle component control unit having one of a control transmitter and a control receiver;
   a computer control unit having the other one of the control transmitter and the control receiver;
   a transmission path coupled to the bicycle component control unit and to the computer control unit;
   wherein the control transmitter communicates both power and data to the control receiver over the transmission path; and
   wherein the control receiver includes a power storage element that is charged from power communicated over the transmission path.

2. The apparatus according to claim 1 wherein the control transmitter communicates the data in a pulse format.

3. The apparatus according to claim 1 wherein the control transmitter communicates the data in an analog signal format.

4. The apparatus according to claim 3 wherein the analog signal is a periodic signal.

5. The apparatus according to claim 1 further comprising:
   a bicycle transmission element;
   a motor coupled to the bicycle transmission element and to the bicycle component control unit; and
   wherein the bicycle component control unit controls the motor for operating the bicycle transmission element.

6. The apparatus according to claim 5 wherein the bicycle transmission element comprises a derailleur.

7. The apparatus according to claim 1 further comprising:
   a suspension element;
   a motor coupled to the suspension element and to the bicycle component control unit; and
   wherein the bicycle component control unit controls the motor for operating the suspension element.

8. The apparatus according to claim 1 wherein the computer control unit is disposed in a bicycle computer adapted to be mounted to the bicycle.

9. The apparatus according to claim 8 wherein the bicycle computer includes an electronic video display.

10. The apparatus according to claim 9 wherein the bicycle computer has a mounting bracket and a display housing, and wherein the computer control unit is disposed in the display housing.

11. The apparatus according to claim 8 wherein the bicycle computer includes a power circuit coupled to the transmission path for receiving power from the transmission path.

12. The apparatus according to claim 11 wherein the bicycle component control unit has the control transmitter, and wherein the computer control unit has the control receiver.

13. The apparatus according to claim 12 wherein the bicycle component control unit includes a processor coupled to the transmitter for controlling the operation of the transmitter.

14. The apparatus according to claim 13 further comprising a power supply for supplying power to the processor.

15. The apparatus according to claim 14 further comprising a first motor driver coupled to the processor.

16. The apparatus according to claim 15 further comprising:
a first motor coupled to the first motor driver; and
a bicycle transmission element coupled to the first motor.

17. The apparatus according to claim 16 wherein the bicycle transmission element comprises a derailleur.

18. The apparatus according to claim 15 further comprising:
a first motor coupled to the first motor driver; and
a suspension element coupled to the first motor.

19. The apparatus according to claim 15 further comprising a second motor driver coupled to the processor.

20. The apparatus according to claim 19 further comprising:
a first motor coupled to the first motor driver;
a bicycle transmission element coupled to the first motor;
a second motor coupled to the second motor driver; and
a suspension element coupled to the second motor.

21. The apparatus according to claim 20 wherein the power supply includes a dynamo.

22. The apparatus according to claim 21 wherein the bicycle computer includes an electronic video display.

23. The apparatus according to claim 22 wherein the bicycle transmission element comprises a derailleur.

24. The apparatus according to claim 19 further comprising:
a first motor coupled to the first motor driver;
a first bicycle transmission element coupled to the first motor;
a second motor coupled to the second motor driver; and
a second bicycle transmission element coupled to the second motor.

25. The apparatus according to claim 24 wherein the power supply includes a dynamo.

26. The apparatus according to claim 25 wherein the bicycle computer includes an electronic video display.

27. The apparatus according to claim 26 wherein the first bicycle transmission element comprises a front derailleur, and wherein the second bicycle transmission element comprises a rear derailleur.

28. A bicycle control apparatus comprising:
a bicycle component control unit having one of a control transmitter and a control receiver;
a computer control unit having the other one of the control transmitter and the control receiver;
a transmission path coupled to the bicycle component control unit and to the computer control unit;
wherein the control transmitter communicates both power and data to the control receiver over the transmission path; and
wherein the power and data are communicated by a composite signal.

29. A bicycle control apparatus comprising:
a bicycle component control unit having one of a control transmitter and a control receiver;
a computer control unit having the other one of the control transmitter and the control receiver;
a transmission path coupled to the bicycle component control unit and to the computer control unit;
wherein the control transmitter communicates both power and data to the control receiver over the transmission path; and
wherein the control receiver receives the power and data through a single serial data stream.

* * * * *